(12) United States Patent
Shtrom et al.

(10) Patent No.: US 9,634,403 B2
(45) Date of Patent: Apr. 25, 2017

(54) RADIO FREQUENCY EMISSION PATTERN SHAPING

(75) Inventors: Victor Shtrom, Los Altos, CA (US); Bernard Baron, Mountain View, CA (US); Chia Ching Ling, San Jose, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 0 days.

(21) Appl. No.: 13/396,482

(22) Filed: Feb. 14, 2012

(65) Prior Publication Data
US 2013/0207865 A1   Aug. 15, 2013

(51) Int. Cl.
*H01Q 3/24* (2006.01)
*H01Q 19/06* (2006.01)
*H01Q 19/10* (2006.01)
*H01Q 21/28* (2006.01)

(52) U.S. Cl.
CPC .................................. *H01Q 21/28* (2013.01)

(58) Field of Classification Search
CPC ...... H01Q 9/285; H01Q 21/062; H01Q 21/10; H01Q 21/205; H01Q 21/29; H01Q 3/446; H01Q 3/24; H01Q 21/28
USPC ........................................................ 343/893
See application file for complete search history.

(56) References Cited

U.S. PATENT DOCUMENTS

| 725,605 | A | 4/1903 | Tesla |
|---|---|---|---|
| 1,869,659 | A | 8/1932 | Broertjes |
| 2,292,387 | A | 8/1942 | Markey et al. |
| 3,488,445 | A | 1/1970 | Chang |
| 3,568,105 | A | 3/1971 | Felsenheld |
| 3,721,990 | A | 3/1973 | Gibson et al. |
| 3,887,925 | A | 6/1975 | Ranghelli |
| 3,967,067 | A | 6/1976 | Potter |
| 3,969,730 | A | 7/1976 | Fuchser |

(Continued)

FOREIGN PATENT DOCUMENTS

| AU | 2003/227399 | 10/2003 |
|---|---|---|
| CA | 02494982 | 10/2003 |

(Continued)

OTHER PUBLICATIONS

Alard, M., et al., "Principles of Modulation and Channel Coding for Digital Broadcasting for Mobile Receivers," 8301 EBU Review Technical, Aug. 1987, No. 224, Brussels, Belgium.

(Continued)

*Primary Examiner* — Hoang V Nguyen
*Assistant Examiner* — Michael Bouizza
(74) *Attorney, Agent, or Firm* — Lewis Roca; Rothgerber Christie LLP

(57) ABSTRACT

Pattern shaping elements shape a radiation pattern generated by one or more antennas. A MIMO antenna system generates an omnidirectional radiation pattern. One or more pattern shaping elements may include metal objects which act as directors or reflectors to shape the radiation pattern. The shaping may be controlled by selectively coupling the pattern shaping elements to a ground plane, thus making them appear transparent to the radiation pattern. The pattern shaping elements may be amorphous, have varying shape, and may be symmetrical or asymmetrical. Different configurations of selected pattern shaping elements may provide different shapes for a radiation pattern.

13 Claims, 5 Drawing Sheets

(56) References Cited

U.S. PATENT DOCUMENTS

| | | |
|---|---|---|
| 3,982,214 A | 9/1976 | Burns |
| 3,991,273 A | 11/1976 | Mathes |
| 4,001,734 A | 1/1977 | Burns |
| 4,027,307 A | 5/1977 | Litchford |
| 4,176,356 A | 11/1979 | Foster et al. |
| 4,193,077 A | 3/1980 | Greenberg et al. |
| 4,203,118 A | 5/1980 | Alford |
| 4,253,193 A | 2/1981 | Kennard |
| 4,305,052 A | 12/1981 | Baril et al. |
| 4,513,412 A | 4/1985 | Cox |
| 4,554,554 A | 11/1985 | Olesen et al. |
| 4,733,203 A | 3/1988 | Ayasli |
| 4,764,773 A | 8/1988 | Larsen et al. |
| 4,800,393 A | 1/1989 | Edward et al. |
| 4,814,777 A | 3/1989 | Monser |
| 4,821,040 A | 4/1989 | Johnson et al. |
| 4,920,285 A | 4/1990 | Clark et al. |
| 4,937,585 A | 6/1990 | Shoemaker |
| 5,063,574 A | 11/1991 | Moose |
| 5,097,484 A | 3/1992 | Akaiwa |
| 5,173,711 A | 12/1992 | Takeuchi et al. |
| 5,203,010 A | 4/1993 | Felix |
| 5,208,564 A | 5/1993 | Burns et al. |
| 5,220,340 A | 6/1993 | Shafai |
| 5,241,693 A | 8/1993 | Kim |
| 5,282,222 A | 1/1994 | Fattouche et al. |
| 5,291,289 A | 3/1994 | Hulyalkar et al. |
| 5,311,550 A | 5/1994 | Fouche et al. |
| 5,337,066 A | 8/1994 | Hirata et al. |
| 5,373,548 A | 12/1994 | McCarthy |
| 5,434,575 A | 7/1995 | Jelinek |
| 5,453,752 A | 9/1995 | Wang et al. |
| 5,479,176 A | 12/1995 | Zavrel |
| 5,507,035 A | 4/1996 | Bantz |
| 5,532,708 A | 7/1996 | Krenz et al. |
| 5,559,800 A | 9/1996 | Mousseau et al. |
| 5,726,666 A | 3/1998 | Hoover et al. |
| 5,754,145 A | 5/1998 | Evans |
| 5,767,755 A | 6/1998 | Kim et al. |
| 5,767,807 A | 6/1998 | Pritchett |
| 5,767,809 A | 6/1998 | Chuang et al. |
| 5,786,793 A | 7/1998 | Maeda et al. |
| 5,802,312 A | 9/1998 | Lazaridis et al. |
| 5,828,346 A | 10/1998 | Park |
| 5,936,595 A | 8/1999 | Wang |
| 5,964,830 A | 10/1999 | Durrett |
| 5,966,102 A | 10/1999 | Runyon |
| 5,990,838 A | 11/1999 | Burns et al. |
| 6,005,519 A | 12/1999 | Burns |
| 6,005,525 A | 12/1999 | Kivela |
| 6,011,450 A | 1/2000 | Miya |
| 6,023,250 A | 2/2000 | Cronyn |
| 6,031,503 A | 2/2000 | Preiss, II et al. |
| 6,034,638 A | 3/2000 | Thiel et al. |
| 6,046,703 A | 4/2000 | Wang |
| 6,052,093 A | 4/2000 | Yao et al. |
| 6,061,025 A | 5/2000 | Jackson |
| 6,067,053 A * | 5/2000 | Runyon et al. ............... 343/797 |
| 6,091,364 A | 7/2000 | Murakami et al. |
| 6,094,177 A | 7/2000 | Yamamoto |
| 6,097,347 A | 8/2000 | Duan et al. |
| 6,104,356 A | 8/2000 | Hikuma et al. |
| 6,169,523 B1 | 1/2001 | Ploussios |
| 6,249,216 B1 | 6/2001 | Flick |
| 6,266,528 B1 | 7/2001 | Farzaneh |
| 6,281,762 B1 | 8/2001 | Nakao |
| 6,288,682 B1 | 9/2001 | Thiel et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,323,810 B1 | 11/2001 | Poilasne et al. |
| 6,326,922 B1 | 12/2001 | Hegendoerfer |
| 6,326,924 B1 | 12/2001 | Muramoto et al. |
| 6,337,628 B2 | 1/2002 | Campana, Jr. |
| 6,337,668 B1 | 1/2002 | Ito et al. |
| 6,339,404 B1 | 1/2002 | Johnson |
| 6,345,043 B1 | 2/2002 | Hsu |
| 6,351,240 B1 | 2/2002 | Karimullah et al. |
| 6,356,242 B1 | 3/2002 | Ploussios |
| 6,356,243 B1 | 3/2002 | Schneider et al. |
| 6,356,905 B1 | 3/2002 | Gershman et al. |
| 6,366,254 B1 | 4/2002 | Sivenpiper |
| 6,377,227 B1 | 4/2002 | Zhu et al. |
| 6,392,610 B1 | 5/2002 | Braun et al. |
| 6,396,456 B1 | 5/2002 | Chiang et al. |
| 6,400,329 B1 | 6/2002 | Barnes |
| 6,404,386 B1 | 6/2002 | Proctor, Jr. et al. |
| 6,407,719 B1 | 6/2002 | Ohira et al. |
| RE37,802 E | 7/2002 | Fattouche et al. |
| 6,414,647 B1 | 7/2002 | Lee |
| 6,424,311 B1 | 7/2002 | Tsai et al. |
| 6,442,507 B1 | 8/2002 | Skidmore et al. |
| 6,445,688 B1 | 9/2002 | Garces et al. |
| 6,456,242 B1 | 9/2002 | Crawford |
| 6,476,773 B2 | 11/2002 | Palmer |
| 6,492,957 B2 | 12/2002 | Carillo et al. |
| 6,493,679 B1 | 12/2002 | Rappaport et al. |
| 6,496,083 B1 | 12/2002 | Kushitani et al. |
| 6,498,589 B1 | 12/2002 | Horii |
| 6,499,006 B1 | 12/2002 | Rappaport et al. |
| 6,507,321 B2 | 1/2003 | Oberschmidt et al. |
| 6,521,422 B1 | 2/2003 | Hsu |
| 6,531,985 B1 | 3/2003 | Jones et al. |
| 6,545,643 B1 | 4/2003 | Sward |
| 6,583,765 B1 | 6/2003 | Schamberget et al. |
| 6,586,786 B2 | 7/2003 | Kitazawa et al. |
| 6,593,891 B2 | 7/2003 | Zhang |
| 6,606,059 B1 | 8/2003 | Barabash |
| 6,611,230 B2 | 8/2003 | Phelan |
| 6,621,029 B2 | 9/2003 | Galmiche |
| 6,625,454 B1 | 9/2003 | Rappaport et al. |
| 6,633,206 B1 | 10/2003 | Kato |
| 6,642,889 B1 | 11/2003 | McGrath |
| 6,642,890 B1 | 11/2003 | Chen |
| 6,674,459 B2 | 1/2004 | Ben-Shachar et al. |
| 6,700,546 B2 | 3/2004 | Benhammou et al. |
| 6,701,522 B1 | 3/2004 | Rubin et al. |
| 6,724,346 B2 | 4/2004 | Le Bolzer |
| 6,725,281 B1 | 4/2004 | Zintel et al. |
| 6,741,219 B2 | 5/2004 | Shor |
| 6,747,605 B2 | 6/2004 | Lebaric |
| 6,753,814 B2 | 6/2004 | Killen et al. |
| 6,757,267 B1 | 6/2004 | Evans |
| 6,762,723 B2 | 7/2004 | Nallo et al. |
| 6,774,852 B2 | 8/2004 | Chiang et al. |
| 6,774,864 B2 | 8/2004 | Evans |
| 6,779,004 B1 | 8/2004 | Zintel et al. |
| 6,819,287 B2 | 11/2004 | Sullivan et al. |
| 6,822,617 B1 | 11/2004 | Mather et al. |
| 6,839,038 B2 | 1/2005 | Weinstein |
| 6,859,176 B2 | 2/2005 | Choi |
| 6,859,182 B2 | 2/2005 | Horii |
| 6,864,852 B2 | 3/2005 | Chiang et al. |
| 6,876,280 B2 | 4/2005 | Nakano |
| 6,876,836 B2 | 4/2005 | Lin |
| 6,879,293 B2 | 4/2005 | Sato |
| 6,888,504 B2 | 5/2005 | Chiang et al. |
| 6,888,893 B2 | 5/2005 | Li et al. |
| 6,892,230 B1 | 5/2005 | Gu et al. |
| 6,894,653 B2 | 5/2005 | Chiang et al. |
| 6,903,686 B2 | 6/2005 | Vance et al. |
| 6,906,678 B2 | 6/2005 | Chen |
| 6,910,068 B2 | 6/2005 | Zintel et al. |
| 6,914,566 B2 | 7/2005 | Beard |
| 6,914,581 B1 | 7/2005 | Popek |
| 6,924,768 B2 | 8/2005 | Wu et al. |
| 6,931,429 B2 | 8/2005 | Gouge et al. |
| 6,933,907 B2 | 8/2005 | Shirosaka |
| 6,941,143 B2 | 9/2005 | Mathur |
| 6,943,749 B2 | 9/2005 | Paun |
| 6,950,019 B2 | 9/2005 | Bellone et al. |
| 6,950,069 B2 | 9/2005 | Gaucher et al. |
| 6,961,028 B2 | 11/2005 | Joy et al. |
| 6,965,353 B2 | 11/2005 | Shirosaka et al. |

(56) References Cited

U.S. PATENT DOCUMENTS

| | | |
|---|---|---|
| 6,973,622 B1 | 12/2005 | Rappaport et al. |
| 6,975,834 B1 | 12/2005 | Forster |
| 6,980,782 B1 | 12/2005 | Braun et al. |
| 7,023,909 B1 | 4/2006 | Adams et al. |
| 7,024,225 B2 | 4/2006 | Ito |
| 7,034,769 B2 | 4/2006 | Surducan et al. |
| 7,034,770 B2 | 4/2006 | Yang et al. |
| 7,043,277 B1 | 5/2006 | Pfister |
| 7,046,201 B2 | 5/2006 | Okada |
| 7,050,809 B2 | 5/2006 | Lim |
| 7,053,844 B2 | 5/2006 | Gaucher et al. |
| 7,064,717 B2 | 6/2006 | Kaluzni |
| 7,085,814 B1 | 8/2006 | Ghandi et al. |
| 7,088,299 B2 | 8/2006 | Siegler et al. |
| 7,088,306 B2 | 8/2006 | Chiang et al. |
| 7,089,307 B2 | 8/2006 | Zintel et al. |
| 7,098,863 B2 | 8/2006 | Bancroft |
| D530,325 S | 10/2006 | Kerila |
| 7,120,405 B2 | 10/2006 | Rofougaran |
| 7,130,895 B2 | 10/2006 | Zintel et al. |
| 7,148,846 B2 | 12/2006 | Qi et al. |
| 7,162,273 B1 | 1/2007 | Ambramov et al. |
| 7,164,380 B2 | 1/2007 | Saito |
| 7,171,475 B2 | 1/2007 | Weisman et al. |
| 7,193,562 B2 | 3/2007 | Shtrom |
| 7,206,610 B2 | 4/2007 | Iacono et al. |
| 7,215,296 B2 | 5/2007 | Ambramov et al. |
| 7,277,063 B2 | 10/2007 | Shirosaka et al. |
| 7,292,198 B2 | 11/2007 | Shtrom |
| 7,292,870 B2 | 11/2007 | Heredia et al. |
| 7,295,825 B2 | 11/2007 | Raddant |
| 7,298,228 B2 | 11/2007 | Sievenpiper |
| 7,312,762 B2 | 12/2007 | Puente Ballarda et al. |
| 7,319,432 B2 | 1/2008 | Andersson |
| 7,333,460 B2 | 2/2008 | Vaisanen et al. |
| 7,358,912 B1 | 4/2008 | Kish et al. |
| 7,362,280 B2 | 4/2008 | Shtrom |
| 7,385,563 B2 | 6/2008 | Bishop |
| 7,498,999 B2 | 3/2009 | Shtrom et al. |
| 7,511,680 B2 | 3/2009 | Shtrom et al. |
| 7,522,569 B2 | 4/2009 | Rada |
| 7,525,486 B2 | 4/2009 | Shtrom |
| 7,609,648 B2 | 10/2009 | Hoffmann et al. |
| 7,697,550 B2 | 4/2010 | Rada |
| 7,733,275 B2 | 6/2010 | Hirota |
| 7,782,895 B2 | 8/2010 | Pasanen et al. |
| 7,835,697 B2 | 11/2010 | Wright |
| 7,847,741 B2 | 12/2010 | Hirota |
| 7,864,119 B2 | 1/2011 | Shtrom et al. |
| 7,893,882 B2 | 2/2011 | Shtrom |
| 7,916,463 B2 | 3/2011 | Aya et al. |
| 8,068,068 B2 | 11/2011 | Kish et al. |
| 8,085,206 B2 | 12/2011 | Shtrom |
| 8,217,843 B2 | 7/2012 | Shtrom |
| 8,355,912 B1 | 1/2013 | Keesey et al. |
| 8,358,248 B2 | 1/2013 | Shtrom |
| 8,686,905 B2 | 4/2014 | Shtrom |
| 8,704,720 B2 | 4/2014 | Kish |
| 8,723,741 B2 | 5/2014 | Shtrom |
| 8,756,668 B2 | 6/2014 | Ranade et al. |
| 8,836,606 B2 | 9/2014 | Kish |
| 9,019,165 B2 | 4/2015 | Shtrom |
| 9,093,758 B2 | 7/2015 | Kish |
| 2001/0046848 A1 | 11/2001 | Kenkel |
| 2002/0031130 A1 | 3/2002 | Tsuchiya et al. |
| 2002/0036586 A1 | 3/2002 | Gothard et al. |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0101377 A1 | 8/2002 | Crawford |
| 2002/0105471 A1 | 8/2002 | Kojima et al. |
| 2002/0112058 A1 | 8/2002 | Weisman et al. |
| 2002/0119757 A1 | 8/2002 | Hamabe |
| 2002/0158798 A1* | 10/2002 | Chiang et al. ............... 342/372 |
| 2002/0163473 A1 | 11/2002 | Koyama et al. |
| 2002/0170064 A1 | 11/2002 | Monroe et al. |
| 2003/0026240 A1 | 2/2003 | Eyuboglu et al. |
| 2003/0030588 A1 | 2/2003 | Kalis et al. |
| 2003/0038698 A1 | 2/2003 | Hirayama |
| 2003/0063591 A1 | 4/2003 | Leung et al. |
| 2003/0122714 A1 | 7/2003 | Wannagot et al. |
| 2003/0169330 A1 | 9/2003 | Ben-Shachar et al. |
| 2003/0174099 A1 | 9/2003 | Bauer et al. |
| 2003/0184490 A1 | 10/2003 | Raiman et al. |
| 2003/0184492 A1 | 10/2003 | Chiang et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0214446 A1 | 11/2003 | Shehab |
| 2003/0227414 A1 | 12/2003 | Saliga et al. |
| 2004/0014432 A1 | 1/2004 | Boyle |
| 2004/0017310 A1 | 1/2004 | Vargas-Hurlston et al. |
| 2004/0017315 A1 | 1/2004 | Fang et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0030900 A1 | 2/2004 | Clark |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |
| 2004/0075609 A1 | 4/2004 | Li |
| 2004/0080455 A1 | 4/2004 | Lee |
| 2004/0090371 A1 | 5/2004 | Rossman |
| 2004/0095278 A1 | 5/2004 | Kanemoto et al. |
| 2004/0114535 A1 | 6/2004 | Hoffmann et al. |
| 2004/0125777 A1 | 7/2004 | Doyle et al. |
| 2004/0145528 A1 | 7/2004 | Mukai et al. |
| 2004/0153647 A1 | 8/2004 | Rotholtz et al. |
| 2004/0160376 A1 | 8/2004 | Hornsby et al. |
| 2004/0190477 A1 | 9/2004 | Olson et al. |
| 2004/0203347 A1 | 10/2004 | Nguyen |
| 2004/0207563 A1 | 10/2004 | Yang |
| 2004/0227669 A1 | 11/2004 | Okada |
| 2004/0260800 A1 | 12/2004 | Gu et al. |
| 2005/0022210 A1 | 1/2005 | Zintel et al. |
| 2005/0041739 A1 | 2/2005 | Li et al. |
| 2005/0042988 A1 | 2/2005 | Hoek et al. |
| 2005/0048934 A1 | 3/2005 | Rawnick et al. |
| 2005/0050352 A1 | 3/2005 | Narayanaswami et al. |
| 2005/0062649 A1 | 3/2005 | Chiang et al. |
| 2005/0074018 A1 | 4/2005 | Zintel et al. |
| 2005/0097503 A1 | 5/2005 | Zintel et al. |
| 2005/0122265 A1 | 6/2005 | Gaucher et al. |
| 2005/0128983 A1 | 6/2005 | Kim et al. |
| 2005/0128988 A1 | 6/2005 | Simpson et al. |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0146475 A1 | 7/2005 | Bettner et al. |
| 2005/0180381 A1 | 8/2005 | Retzer et al. |
| 2005/0184920 A1 | 8/2005 | Mahler et al. |
| 2005/0188193 A1 | 8/2005 | Kuehnel et al. |
| 2005/0237258 A1* | 10/2005 | Abramov et al. ............ 343/834 |
| 2005/0240665 A1 | 10/2005 | Gu et al. |
| 2005/0267935 A1 | 12/2005 | Gandhi et al. |
| 2006/0031922 A1 | 2/2006 | Sakai |
| 2006/0038734 A1 | 2/2006 | Shtrom et al. |
| 2006/0050005 A1 | 3/2006 | Shirosaka et al. |
| 2006/0094371 A1 | 5/2006 | Nguyen |
| 2006/0098607 A1 | 5/2006 | Zeng et al. |
| 2006/0109191 A1 | 5/2006 | Shtrom |
| 2006/0111902 A1 | 5/2006 | Julia et al. |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0168159 A1 | 7/2006 | Weisman et al. |
| 2006/0184660 A1 | 8/2006 | Rao et al. |
| 2006/0184661 A1 | 8/2006 | Weisman et al. |

(56) References Cited

U.S. PATENT DOCUMENTS

| | | | |
|---|---|---|---|
| 2006/0184693 A1 | 8/2006 | Rao et al. | |
| 2006/0224690 A1 | 10/2006 | Falkenburg et al. | |
| 2006/0225107 A1 | 10/2006 | Seetharaman et al. | |
| 2006/0227062 A1* | 10/2006 | Francque et al. | 343/893 |
| 2006/0227761 A1 | 10/2006 | Scott, III et al. | |
| 2006/0239369 A1 | 10/2006 | Lee | |
| 2006/0251256 A1 | 11/2006 | Asokan et al. | |
| 2006/0262015 A1 | 11/2006 | Thornell-Pers et al. | |
| 2006/0291434 A1 | 12/2006 | Gu et al. | |
| 2007/0027622 A1 | 2/2007 | Cleron et al. | |
| 2007/0037619 A1 | 2/2007 | Matsunaga et al. | |
| 2007/0055752 A1 | 3/2007 | Wiegand et al. | |
| 2007/0115180 A1 | 5/2007 | Kish et al. | |
| 2007/0124490 A1 | 5/2007 | Kalavade et al. | |
| 2007/0130294 A1 | 6/2007 | Nishio | |
| 2007/0135167 A1 | 6/2007 | Liu | |
| 2008/0060064 A1 | 3/2008 | Wynn et al. | |
| 2008/0062058 A1 | 3/2008 | Bishop | |
| 2008/0075280 A1 | 3/2008 | Ye et al. | |
| 2008/0096492 A1 | 4/2008 | Yoon | |
| 2008/0109657 A1 | 5/2008 | Bajaj et al. | |
| 2008/0136715 A1 | 6/2008 | Shtrom | |
| 2008/0204331 A1* | 8/2008 | Shtrom | H01Q 1/241 343/702 |
| 2008/0212535 A1 | 9/2008 | Karaoguz et al. | |
| 2008/0272977 A1 | 11/2008 | Gaucher et al. | |
| 2009/0005005 A1 | 1/2009 | Forstall et al. | |
| 2009/0103731 A1 | 4/2009 | Sarikaya | |
| 2009/0187970 A1 | 7/2009 | Mower et al. | |
| 2009/0217048 A1 | 8/2009 | Smith | |
| 2009/0219903 A1* | 9/2009 | Alamouti et al. | 370/338 |
| 2009/0295648 A1 | 12/2009 | Dorsey et al. | |
| 2009/0315794 A1 | 12/2009 | Alamouti et al. | |
| 2010/0053023 A1 | 3/2010 | Shtrom | |
| 2010/0103065 A1* | 4/2010 | Shtrom et al. | 343/795 |
| 2010/0103066 A1 | 4/2010 | Shtrom et al. | |
| 2010/0299518 A1 | 11/2010 | Viswanathan et al. | |
| 2010/0332828 A1 | 12/2010 | Goto | |
| 2011/0007705 A1 | 1/2011 | Buddhikot et al. | |
| 2011/0040870 A1 | 2/2011 | Wynn et al. | |
| 2011/0047603 A1 | 2/2011 | Gordon et al. | |
| 2011/0095960 A1 | 4/2011 | Shtrom | |
| 2011/0126016 A1 | 5/2011 | Sun | |
| 2011/0208866 A1 | 8/2011 | Marmolejo-Meillon et al. | |
| 2012/0030466 A1 | 2/2012 | Yamaguchi | |
| 2012/0054338 A1 | 3/2012 | Ando | |
| 2012/0089845 A1 | 4/2012 | Raleigh | |
| 2012/0098730 A1 | 4/2012 | Kish | |
| 2012/0134291 A1 | 5/2012 | Raleigh | |
| 2012/0257536 A1 | 10/2012 | Kholaif et al. | |
| 2012/0284785 A1 | 11/2012 | Salkintzis et al. | |
| 2012/0299772 A1 | 11/2012 | Shtrom | |
| 2012/0322035 A1 | 12/2012 | Julia et al. | |
| 2013/0007853 A1 | 1/2013 | Gupta et al. | |
| 2013/0038496 A1 | 2/2013 | Shtrom | |
| 2013/0047218 A1 | 2/2013 | Smith | |
| 2013/0182693 A1 | 7/2013 | Sperling et al. | |
| 2013/0207866 A1 | 8/2013 | Shtrom | |
| 2013/0207877 A1 | 8/2013 | Shtrom | |
| 2013/0212656 A1 | 8/2013 | Ranade et al. | |
| 2013/0241789 A1 | 9/2013 | Shtrom | |
| 2013/0269008 A1 | 10/2013 | Sheu et al. | |
| 2014/0210681 A1 | 7/2014 | Shtrom | |
| 2014/0282951 A1 | 9/2014 | Ranade | |
| 2014/0334322 A1 | 11/2014 | Shtrom | |
| 2015/0070243 A1 | 3/2015 | Kish | |

FOREIGN PATENT DOCUMENTS

| | | |
|---|---|---|
| DE | 10 2006 026350 | 12/2006 |
| EP | 352 787 | 1/1990 |
| EP | 0 534 612 | 3/1993 |
| EP | 0 756 381 | 1/1997 |
| EP | 0 883 206 | 12/1998 |
| EP | 1 152 452 | 11/2001 |
| EP | 1 152 542 | 11/2001 |
| EP | 1 152 543 | 11/2001 |
| EP | 1 376 920 | 6/2002 |
| EP | 1 220 461 | 7/2002 |
| EP | 1 315 311 | 5/2003 |
| EP | 1 450 521 | 8/2004 |
| EP | 1 608 108 | 12/2005 |
| EP | 1 909 358 | 4/2008 |
| EP | 1 287 588 | 1/2009 |
| GB | 2 426 870 | 6/2006 |
| GB | 2 423 191 | 8/2006 |
| JP | 03038933 | 2/1991 |
| JP | 2008/088633 | 4/1996 |
| JP | 2001-057560 | 2/2001 |
| JP | 2002-505835 | 2/2002 |
| JP | 2005-354249 | 12/2005 |
| JP | 2006/060408 | 3/2006 |
| TW | 201351188 | 12/2013 |
| WO | WO 90/04893 | 5/1990 |
| WO | WO 99/55012 | 10/1999 |
| WO | WO 01/13461 | 2/2001 |
| WO | WO 01/69724 | 9/2001 |
| WO | WO 02/07258 A2 | 1/2002 |
| WO | WO 02/07258 A3 | 1/2002 |
| WO | WO 02/25967 | 3/2002 |
| WO | WO 03/079484 | 9/2003 |
| WO | WO 03/081718 | 10/2003 |
| WO | WO 2004/051798 | 6/2004 |
| WO | WO 2006/023247 | 3/2006 |
| WO | WO 2006/057679 | 6/2006 |
| WO | WO 2007/076105 | 7/2007 |
| WO | WO 2007/127087 | 11/2007 |
| WO | WO 2013/119750 | 8/2013 |
| WO | WO 2013/152027 | 10/2013 |

OTHER PUBLICATIONS

Ando et al., "Study of Dual-Polarized Omni-Directional Antennas for 5.2 GHz-Band 2×2 MIMO-OFDM Systems," Antennas and Propogation Society International Symposium, 2004, IEEE, pp. 1740-1743 vol. 2.

Areg Alimian et al., "Analysis of Roaming Techniques," doc.:IEEE 802.11-04/0377r1, Submission, Mar. 2004.

"Authorization of Spread Spectrum Systems Under Parts 15 and 90 of the FCC Rules and Regulations" Rules and Federal Communications Commission, 47 CFR Part 2, and 90, Jun. 18, 1985.

"Authorization of spread spectrum and other wideband emissions not presently provided for in the FCC Rules and Regulations," Before the Federal Communications Commission, FCC 81-289, 87 F.C.C.2d 876, Gen Docket No. 81-413, Jun. 30, 1981.

Bedell, Paul, "Wireless Crash Course," 2005, p. 84, The McGraw-Hill Companies, Inc., USA.

Behdad et al., Slot Antenna Miniaturization Using Distributed Inductive Loading, Antenna and Propagation Society International Symposium, 2003 IEEE, vol. 1, pp. 308-311 (Jun. 2003).

Berenguer, Inaki, et al., "Adaptive MIMO Antenna Selection," Nov. 2003.

Casas, Eduardo F., et al., "OFDM for Data Communication Over Mobile Radio FM Channels—Part I: Analysis and Experimental Results," IEEE Transactions on Communications, vol. 39, No. 5, May 1991, pp. 783-793.

Chang, Nicholas B. et al., "Optimal Channel Probing and Transmission Scheduling for Opportunistics Spectrum Access," Sep. 2007.

Chang, Robert W., et al., "A Theoretical Study of Performance of an Orthogonal Multiplexing Data Transmission Scheme," IEEE Transactions on Communication Technology, vol. Com-16, No. 4, Aug. 1968, pp. 529-540.

Chang, Robert W. "Synthesis of Band-Limited Orthogonal Signals for Multichannel Data Transmission," The Bell System Technical Journal, Dec. 1966, pp. 1775-1796.C.

Chuang et al., A 2.4 GHz Polarization-diversity Planar Printed Dipole Antenna for WLAN and Wireless Communication Applications, Microwave Journal, vol. 45, No. 6, pp. 50-62 (Jun. 2002).

(56) References Cited

OTHER PUBLICATIONS

Cimini, Jr., Leonard J, "Analysis and Simulation of a Digital Mobile Channel Using Orthogonal Frequency Division Multiplexing," IEEE Transactions on Communications, vol. Com-33, No. 7, Jul. 1985, pp. 665-675.
Cisco Systems, "Cisco Aironet Access Point Software Configuration Guide: Configuring Filters and Quality of Service," Aug. 2003.
Dell Inc., "How Much Broadcast and Multicast Traffic Should I Allow in My Network," PowerConnect Application Note #5, Nov. 2003.
Dutta, Ashutosh et al., "MarconiNet Supporting Streaming Media Over Localized Wireless Multicast," Proc. of the 2d Int'l Workshop on Mobile Commerce, 2002.
Dunkels, Adam et al., "Making TCP/IP Viable for Wireless Sensor Networks," Proc. of the 1st Euro. Workshop on Wireless Sensor Networks, Berlin, Jan. 2004.
Dunkels, Adam et al., "Connecting Wireless Sensornets with TCP/IP Networks," Proc. of the 2d Int'l Conf. on Wired Networks, Frankfurt, Feb. 2004.
Festag, Andreas, "What is MOMBASA?" Telecommunication Networks Group (TKN), Technical University of Berlin, Mar. 7, 2002.
Frederick et al., Smart Antennas Based on Spatial Multiplexing of Local Elements (SMILE) for Mutual Coupling Reduction, IEEE Transactions of Antennas and Propogation, vol. 52., No. 1, pp. 106-114 (Jan. 2004).
Gaur, Sudhanshu, et al., "Transmit/Receive Antenna Selection for MIMO Systems to Improve Error Performance of Linear Receivers," School of ECE, Georgia Institute of Technology, Apr. 4, 2005.
Gledhill, J. J., et al., "The Transmission of Digital Television in the UHF Band Using Orthogonal Frequency Division Multiplexing," Sixth International Conference on Digital Processing of Signals in Communications, Sep. 2-6, 1991, pp. 175-180.
Golmie, Nada, "Coexistence in Wireless Networks: Challenges and System-Level Solutions in the Unlicensed Bands," Cambridge University Press, 2006.
Hewlett Packard, "HP ProCurve Networking: Enterprise Wireless LAN Networking and Mobility Solutions," 2003.
Hirayama, Koji et al., "Next-Generation Mobile-Access IP Network," Hitachi Review vol. 49, No. 4, 2000.
Information Society Technologies Ultrawaves, "System Concept / Architecture Design and Communication Stack Requirement Document," Feb. 23, 2004.
Ken Tang, et al., "MAC Layer Broadcast Support in 802.11 Wireless Networks," Computer Science Department, University of California, Los Angeles, 2000 IEEE, pp. 544-548.
Ken Tang, et al., "MAC Reliable Broadcast in Ad Hoc Networks," Computer Science Department, University of California, Los Angeles, 2001 IEEE, pp. 1008-1013.
Mawa, Rakesh, "Power Control in 3G Systems," Hughes Systique Corporation, Jun. 28, 2006.
Microsoft Corporation, "IEEE 802.11 Networks and Windows XP," Windows Hardware Developer Central, Dec. 4, 2001.
Molisch, Andreas F., et al., "MIMO Systems with Antenna Selection—an Overview," Draft, Dec. 31, 2003.
Moose, Paul H., "Differential Modulation and Demodulation of Multi-Frequency Digital Communications Signals," 1990 IEEE,CH2831-6/90/0000-0273.
Pat Calhoun et al., "802.11r strengthens wireless voice," Technology Update, Network World, Aug. 22, 2005, http://www.networkworld.com/news/tech/2005/082208techupdate.html.
Press Release, Netgear RangeMax(TM) Wireless Networking Solutions Incorporate Smart MIMO Technology to Eliminate Wireless Dead Spots and Take Consumers Farther, Ruckus Wireles Inc. (Mar. 7, 2005), available at http://ruckuswireless.com/press/releases/20050307.php.
RL Miller, "4.3 Project X—A True Secrecy System for Speech," Engineering and Science in the Bell System, a History of Engineering and Science in the Bell System National Service in War and Peace (1925-1975), pp. 296-317, 1978, Bell Telephone Laboratories, Inc.
Sadek, Mirette, et al., "Active Antenna Selection in Multiuser MIMO Communications," IEEE Transactions on Signal Processing, vol. 55, No. 4, Apr. 2007, pp. 1498-1510.
Saltzberg, Burton R., "Performance of an Efficient Parallel Data Transmission System," IEEE Transactions on Communication Technology, vol. Com-15, No. 6, Dec. 1967, pp. 805-811.
Steger, Christopher et al., "Performance of IEEE 802.11b Wireless LAN in an Emulated Mobile Channel," 2003.
Toskala, Antti, "Enhancement of Broadcast and Introduction of Multicast Capabilities in RAN," Nokia Networks, Palm Springs, California, Mar. 13-16, 2001.
Tsunekawa, Kouichi, "Diversity Antennas for Portable Telephones," 39th IEEE Vehicular Technology Conference, pp. 50-56, vol. I, Gateway to New Concepts in Vehicular Technology, May 1-3, 1989, San Francisco, CA.
Varnes et al., A Switched Radial Divider for an L-Band Mobile Satellite Antenna, European Microwave Conference (Oct. 1995), pp. 1037-1041.
Vincent D. Park, et al., "A Performance Comparison of the Temporally-Ordered Routing Algorithm and Ideal Link-State Routing," IEEE, Jul. 1998, pp. 592-598.
W.E. Doherty, Jr. et al., The Pin Diode Circuit Designer's Handbook (1998).
Weinstein, S. B., et al., "Data Transmission by Frequency-Division Multiplexing Using the Discrete Fourier Transform," IEEE Transactions on Communication Technology, vol. Com-19, No. 5, Oct. 1971, pp. 628-634.
Wennstrom, Mattias et al., "Transmit Antenna Diversity in Ricean Fading MIMO Channels with Co-Channel Interference," 2001.
Petition Decision Denying Request to Order Additional Claims for U.S. Pat. No. 7,193,562 (Control No. 95/001078) mailed on Jul. 10, 2009. cited by other.
Right of Appeal Notice for U.S. Pat. No. 7,193,562 (Control No. 95/001078) mailed on Jul. 10, 2009.
European Examination Report for EP Application No. 05776697.4 mailed Jan. 21, 2011.
European Second Examination Report for EP Application No. 07775498.4 dated Mar. 12, 2013.
European Third Examination Report for EP Application No. 07775498.4 dated Oct. 17, 2011.
European First Examination Report for EP Application No. 09014989.9 dated May 7, 2012.
Supplementary European Search Report for EP Application No. EP05776697.4 dated Jul. 10, 2009.
Supplementary European Search Report for EP Application No. EP07755519 dated Mar. 11, 2009.
PCT Application No. PCT/US2005/27023, International Search Report and Written Opinion mailed Dec. 23, 2005.
PCT Application No. PCT/US2006/49211, International Search Report and Written Opinion mailed Aug. 29, 2008.
PCT Application No. PCT/US2007/09276, International Search Report and Written Opinion mailed Aug. 11, 2008.
Chinese Application No. 200680048001.7, Office Action dated Jun. 20, 2012.
Chinese Application No. 200780020943.9, Office Action dated Feb. 7, 2013.
Chinese Application No. 200780020943.9, Office Action dated Aug. 29, 2012.
Chinese Application No. 200780020943.9, Office Action dated Dec. 19, 2011.
Chinese Application No. 200910258884.X, Office Action dated Aug. 3, 2012.
Taiwan Application No. 094127953, Office Action dated Mar. 20, 2012.
Taiwan Application No. 096114265, Office Action dated Jun. 20, 2011.
U.S. Appl. No. 11/010,076, Office Action mailed Oct. 31, 2006.
U.S. Appl. No. 11/010,076, Final Office Action mailed Aug. 8, 2006.
U.S. Appl. No. 11/010,076, Office Action mailed Dec. 23, 2006.
U.S. Appl. No. 11/022,080, Office Action mailed Jul. 21, 2006.
U.S. Appl. No. 11/041,145, Final Office Action mailed Jan. 29, 2007.
U.S. Appl. No. 11/041,145, Office Action mailed Jul. 21, 2006.

(56) References Cited

OTHER PUBLICATIONS

U.S. Appl. No. 11/265,751, Office Action mailed Mar. 18, 2008.
U.S. Appl. No. 11/413,461, Office Action mailed Jun. 7, 2007.
U.S. Appl. No. 11/714,707, Final Office Action mailed May 30, 2008.
U.S. Appl. No. 11/714,707, Office Action mailed Oct. 15, 2007.
U.S. Appl. No. 11/924,082, Office Action mailed Aug. 29, 2008.
U.S. Appl. No. 12/082,090, Office Action mailed Jan. 18, 2011.
U.S. Appl. No. 12/404,124, Final Office Action mailed Feb. 7, 2012.
U.S. Appl. No. 12/404,124, Office Action mailed Sep. 19, 2011.
U.S. Appl. No. 12/953,324, Office Action mailed Mar. 24, 2011.
U.S. Appl. No. 13/280,278, Office Action mailed Mar. 25, 2013.
U.S. Appl. No. 13/280,278, Final Office Action mailed Aug. 22, 2012.
U.S. Appl. No. 13/280,278, Office Action mailed Feb. 21, 2012.
U.S. Appl. No. 13/305,609, Final Office Action mailed Jul. 3, 2012.
U.S. Appl. No. 13/305,609, Office Action mailed Dec. 20, 2011.
U.S. Appl. No. 13/485,012, Final Office Action mailed Mar. 3, 2013.
U.S. Appl. No. 13/485,012, Office Action mailed Oct. 25, 2012.
Abramov 2003—P.R. 3-3 © Chart for U.S. Pat. No. 7,525,486 and U.S. Pat. No. 7,193,562.
Airgain 2004—P.R. 3-3 © Chart for U.S. Pat. No. 7,525,486 and U.S. Pat. No. 7,193,562.
Cetiner 2003—P.R. 3-3 © Chart for U.S. Pat. No. 7,525,486 and U.S. Pat. No. 7,193,562.
Chuang 2003—P.R. 3-3 © Chart for U.S. Pat. No. 7,525,486 and U.S. Pat. No. 7,193,562.
Kalis 2002—P.R. 3-3 © Chart for U.S. Pat. No. 7,525,486.
Qian 2000—P.R. 3-3 © Chart for U.S. Pat. No. 7,525,486 and U.S. Pat. No. 7,193,562.
Shehab 2003—P.R. 3-3 © Chart for U.S. Pat. No. 7,525,486 and U.S. Pat. No. 7,193,562.
Shtrom 198 & 280—P.R. 3-3 © Chart for U.S. Pat. No. 7,525,486 and U.S. Pat. No. 7,193,562.
Simons 1994—P.R. 3-3 © Chart for U.S. Pat. No. 7,525,486 and U.S. Pat. No. 7,193,562.
Vaughan 1995—P.R. 3-3 © Chart for U.S. Pat. No. 7,525,486 and U.S. Pat. No. 7,193,562.
Bargh et al., "Fast Authentication Methods for Handovers between IEEE 802.11 Wireless LANs", Proceedings of the ACM International Workshop on Wireless Mobile Applications and Services on WLAN Hotspots. Oct. 1, 2004.
Kassab et al., "Fast Pre-Authentication Based on Proactive Key Distribution for 802.11 Infrastructure Networks", WMuNeP'05, Oct. 13, 2005, Montreal, Quebec, Canada, Copyright 2005 ACM.
European Second Examination Report for EP Application No. 09014989.9 dated Dec. 13, 2013.
Taiwan Application No. 094141018, Office Action dated May 8, 2013.
U.S. Appl. No. 13/653,405, Office Action mailed Dec. 19, 2013.
Encrypted Preshared key; cisco corp. 14 pages, 2010.
Request for Inter Partes Reexamination for U.S. Pat. No. 7,358,912, filed by Rayspan Corporation and Netgear, Inc. on Sep. 4, 2008.
Third Party Comments after Patent Owner's Response in Accordance with 37 CFR 1.947 for U.S. Pat. No. 7,358,912 (Control No. 95/001079) mailed on Jul. 17, 2009.
U.S. Appl. No. 95/001,078, filed Sep. 4, 2008, Shtrom et al. (Re-Exam).
U.S. Appl. No. 95/001,079, filed Sep. 4, 2008, Shtrom et al. (Re-Exam).
PCT Application No. PCT/US2005/027169, International Search Report and Written Opinion mailed Aug. 10, 2006.
PCT Application No. PCT/US2013/34997, International Search Report mailed Jun. 17, 2013.
Chinese Application No. 20058001532.6, Office Action dated Jun. 23, 2011.
Chinese Application No. 200910258884.X, Office Action dated Apr. 15, 2013.
Taiwan Application No. 094127953, Office Action dated Aug. 16, 2011.
U.S. Appl. No. 12/404,127, Final Office Action mailed Feb. 7, 2012.
U.S. Appl. No. 12/404,127, Office Action mailed Sep. 19, 2011.
U.S. Appl. No. 11/877,465, Final Office Action mailed May 16, 2013.
U.S. Appl. No. 11/877,465, Office Action mailed Oct. 3, 2012.
U.S. Appl. No. 11/877,465, Final Office Action mailed Jun. 20, 2012.
U.S. Appl. No. 11/877,465, Office Action mailed Sep. 19, 2011.
U.S. Appl. No. 11/877,465, Final Office Action mailed Dec. 9, 2010.
U.S. Appl. No. 11/877,465, Office Action mailed Apr. 12, 2010.
U.S. Appl. No. 12/980,253, Final Office Action mailed Jun. 6, 2013.
U.S. Appl. No. 12/980,253, Office Action mailed Aug. 17, 2012.
U.S. Appl. No. 12/980,253, Office Action mailed Sep. 13, 2011.
U.S. Appl. No. 12/980,253, Office Action mailed Mar. 1, 2011.
U.S. Appl. No. 12/425,374, Office Action mailed Jul. 6, 2010.
U.S. Appl. No. 13/653,405, Office Action mailed Dec. 19, 2012.
U.S. Appl. No. 13/731,273, Office Action mailed May 23, 2013.
U.S. Appl. No. 13/396,484, Office Action mailed Oct. 11, 2013.
U.S. Appl. No. 13/370,201, Office Action mailed May 13, 2013.
U.S. Appl. No. 13/439,844, Final Office Action mailed Oct. 28, 2013.
U.S. Appl. No. 13/439,844, Office Action mailed Jun. 5, 2013.
U.S. Appl. No. 11/877,465, Office Action mailed Jul. 29, 2014.
U.S. Appl. No. 14/242,689, Victor Shtrom, Pattern Shaping of RF Emission Patterns, filed Apr. 1, 2014.
U.S. Appl. No. 12/980,253, Office Action mailed Mar. 27, 2014.
U.S. Appl. No. 13/396,484, Final Office Action mailed Apr. 11, 2014.
U.S. Appl. No. 13/439,844, Office Action mailed Apr. 22, 2014.
Google, "Hotspots pre-shared keys". Date of download: Nov. 24, 2014.
IEEE Xplore Digital Library "Hotspots shared keys". Date of download: Nov. 24, 2014.
PCT Application No. PCT/US2013/34997, Written Opinion mailed Jun. 17, 2013 (Date of Online Publication: Oct. 4, 2014).
U.S. Appl. No. 13/862,834, Office Action mailed Apr. 27, 2015.
U.S. Appl. No. 12/980,253, Final Office Action mailed Jan. 23, 2015.
U.S. Appl. No. 13/396,484, Office Action mailed Jan. 21, 2015.
U.S. Appl. No. 12/980,253, Office Action mailed Sep. 28, 2015.
U.S. Appl. No. 13/862,834, Final Office Action mailed Sep. 22, 2015.
U.S. Appl. No. 13/396,484, Final Office Action mailed Aug. 20, 2015.
U.S. Appl. No. 14/275,887, Victor Shtrom, Adjustment of Radiation Patterns Utilizing a Position Sensor, filed May 13, 2014.
U.S. Appl. No. 14/294,012, Prashant Ranade, Dynamic PSK for Hotspots, filed Jun. 2, 2014.

\* cited by examiner

RADIO FREQUENCY EMISSION PATTERN SHAPING

BACKGROUND OF INVENTION

1. Field of the Invention

The present invention generally relates to wireless communications and more particularly to changing radio frequency (RF) emission patterns with respect to one or more antenna arrays.

2. Description of the Prior Art

In wireless communications systems, there is an ever-increasing demand for higher data throughput and a corresponding drive to reduce interference that can disrupt data communications. For example, a wireless link in an Institute of Electrical and Electronic Engineers (IEEE) 802.11 network may be susceptible to interference from other wireless access points and stations, radio transmitting devices in the vicinity of the network, and changes or disturbances in the wireless link environment between an access point and remote receiving node. In some instances, the interference may degrade the wireless link thereby forcing communication at a lower data rate. The interference may, in some instances, be sufficiently strong as to disrupt the wireless link altogether.

One solution is to utilize a diversity antenna scheme. In such a solution, a data source is coupled to two or more physically separated omnidirectional antennas. An access point may select one of the omnidirectional antennas by which to maintain a wireless link. Because of the separation between the omnidirectional antennas, each antenna experiences a different signal environment and corresponding interference level with respect to the wireless link. A switching network couples the data source to whichever of the omnidirectional antennas experiences the least interference in the wireless link.

Notwithstanding, many high-gain antenna environments still encounter—or cause—electromagnetic interference (EMI). This interference may be encountered (or created) with respect to another nearby wireless environments (e.g., between the floors of an office building or hot spots scattered amongst a single room). In some instances, the mere operation of a power supply or electronic equipment can create electromagnetic interference.

One solution to combat electromagnetic interference is to utilize shielding in or proximate an antenna enclosure. Shielding a metallic enclosure is imperfect, however, because the conductivity of all metals is finite. Because metallic shields have less than infinite conductivity, part of the field is transmitted across the boundary and supports a current in the metal. The amount of current flow at any depth in the shield and the rate of decay are governed by the conductivity of the metal, its permeability, and the frequency and amplitude of the field source.

With varying locations of devices communicating with omnidirectional antennas and the varied electromagnetic interference in most environments, it is desirable to have control over an emitted radiation pattern to focus the radiation pattern where it would be most useful.

SUMMARY OF THE INVENTION

The presently claimed invention utilizes pattern shaping elements for shaping a radiation pattern generated by one or more antennas. A MIMO antenna system generates an omnidirectional radiation pattern. One or more pattern shaping elements may include metal objects which act as directors or reflectors to shape the radiation pattern. The shaping may be controlled by selectively coupling the pattern shaping elements to a ground plane, thus making them appear transparent to the radiation pattern. The pattern shaping elements may be amorphous, have varying shape, and may be symmetrical or asymmetrical. Different configurations of selected pattern shaping elements may provide different shapes for a radiation pattern.

An embodiment of a wireless device may include an antenna array, a plurality of pattern shaping elements, and plurality of connecting elements. An antenna array comprising a plurality of antenna elements may generate a substantially omnidirectional radiation pattern. Each connecting elements may connect one or more pattern shaping elements to a ground. Each of the pattern shaping elements connected to ground may cause a change in the substantially omnidirectional radiation pattern generated by the antenna array.

DETAILED DESCRIPTION

Embodiments of the present invention use metal objects as pattern shaping elements for shaping a radiation pattern generated by one or more antennas. A MIMO antenna array generates an omnidirectional radiation pattern. One or more pattern shaping elements may act as directors or reflectors to shape the radiation pattern. The shaping may be controlled by selectively coupling the pattern shaping elements to a ground plane, thus making them appear transparent to the radiation pattern. The pattern shaping elements may be amorphous, vary in shape, symmetrical or asymmetrical, and varying heights and widths. The pattern shaping elements may be selected in different configurations to provide different shaping for a radiation pattern.

Figure 1:
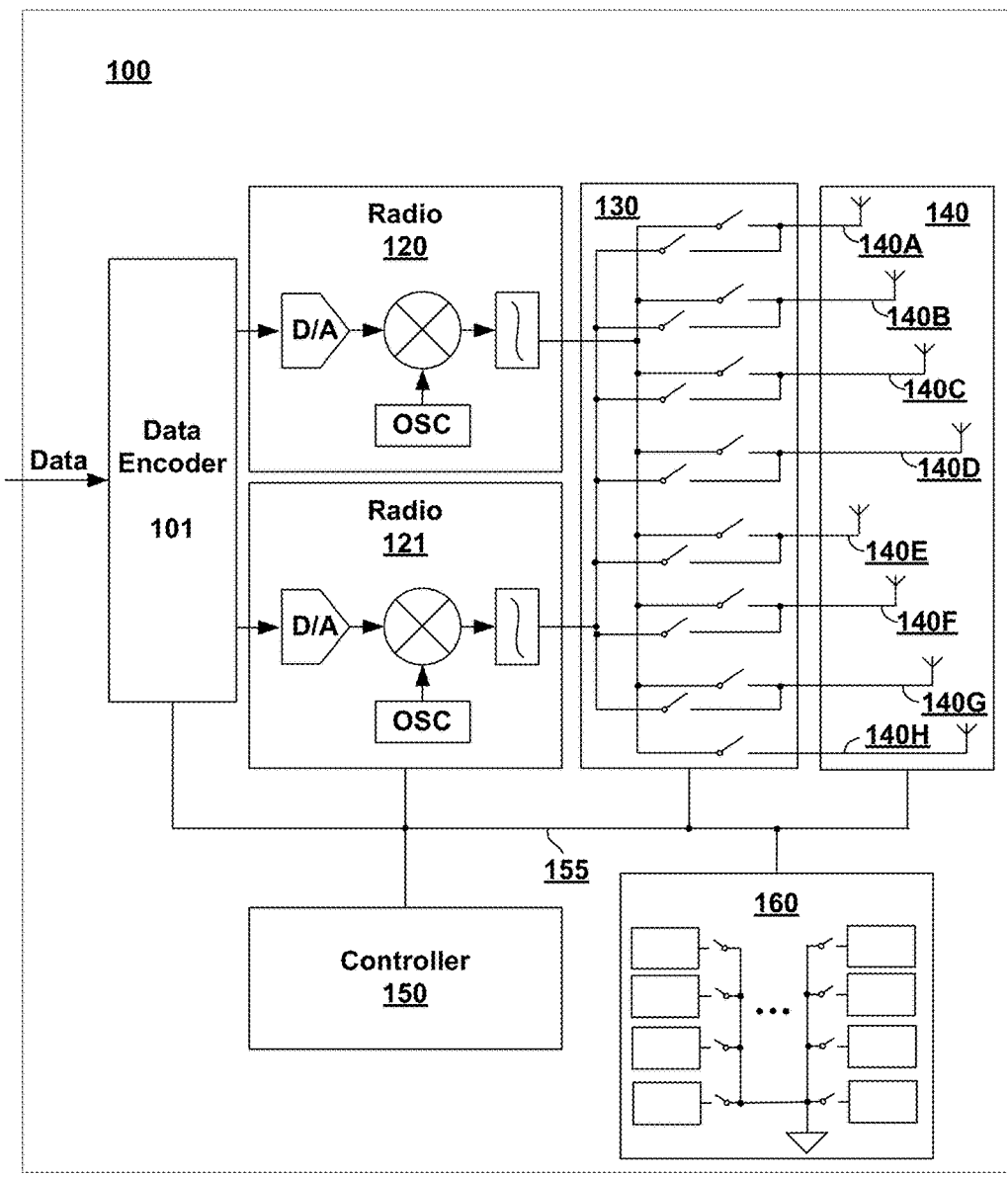
FIG. 1 illustrates a wireless MIMO antenna system having multiple antennas and multiple radios.

FIG. 1 illustrates a wireless MIMO antenna system having multiple antennas and multiple radios. The wireless MIMO antenna system 100 may be representative of a transmitter and/or a receiver such as an 802.11 access point or an 802.11 receiver. System 100 may also be representative of a set-top box, a laptop computer, television, Personal Computer Memory Card International Association (PCM-CIA) card, Voice over Internet Protocol (VoIP) telephone, or handheld gaming device.

Wireless MIMO antenna system 100 may include a communication device for generating a radio frequency (RF) signal (e.g., in the case of transmitting node). Wireless MIMO antenna system 100 may also or alternatively receive data from a router connected to the Internet. Wireless MIMO antenna system 100 may then transmit that data to one or more of the remote receiving nodes. For example, the data may be video data transmitted to a set-top box for display on a television or video display.

The wireless MIMO antenna system 100 may form a part of a wireless local area network (e.g., a mesh network) by enabling communications among several transmission and/ or receiving nodes. Although generally described as transmitting to a remote receiving node, the wireless MIMO antenna system 100 of FIG. 1 may also receive data subject to the presence of appropriate circuitry. Such circuitry may include but is not limited to a decoder, down conversion circuitry, samplers, digital-to-analog converters, filters, and so forth.

Wireless MIMO antenna system 100 includes a data encoder 101 for encoding data into a format appropriate for transmission to the remote receiving node via the parallel radios 120 and 121 illustrated in FIG. 1. While two radios are illustrated in FIG. 1, additional radios or RF chains may be utilized. Data encoder 101 may include data encoding elements such as direct sequence spread-spectrum (DSSS) or Orthogonal Frequency Division Multiplex (OFDM) encoding mechanisms to generate baseband data streams in an appropriate format. Data encoder 101 may include hardware and/or software elements for converting data received into the wireless MIMO antenna system 100 into data packets compliant with the IEEE 802.11 format. Such software elements may be embedded in memory or other non-transitory computer readable storage media and coupled to appropriate processing components. In some instances, the appropriate conversion elements may be implemented in the context of a hardware element such as an application specific processor.

Radios 120 and 121 as illustrated in FIG. 1 include transmitter or transceiver elements configured to upconvert the baseband data streams from the data encoder 101 to radio signals. Radios 120 and 121 thereby establish and maintain the wireless link. Radios 120 and 121 may include direct-to-RF upconverters or heterodyne upconverters for generating a first RF signal and a second RF signal, respectively. The first and second RF signals are generally at the same center frequency and bandwidth but may be offset in time or otherwise space-time coded.

Wireless MIMO antenna system 100 further includes a circuit (e.g., switching network) 130 for selectively coupling the first and second RF signals from the parallel radios 120 and 121 to an antenna apparatus 140 having multiple antenna elements 140A-H. Antenna elements 140A-H may include individually selectable antenna elements such that each antenna element 140A-H may be electrically selected (e.g., switched on or off). By selecting various combinations of the antenna elements 140A-H, the antenna apparatus 140 may form a "pattern agile" or reconfigurable radiation pattern. If certain or substantially all of the antenna elements 140A-H are switched on, for example, the antenna apparatus 140 may form an omnidirectional radiation pattern. Through the use of MIMO antenna architecture, the pattern may include both vertically and horizontally polarized energy, which may also be referred to as diagonally polarized radiation. Alternatively, the antenna apparatus 140 may form various directional radiation patterns, depending upon which of the antenna elements 140A-H are turned on.

The RF within circuit 130 may be PIN diodes, gallium arsenide field-effect transistors (GaAs FETs), or virtually any RF switching device. The PIN diodes comprise single-pole single-throw switches to switch each antenna element either on or off (i.e., couple or decouple each of the antenna elements to the radio radios 120). A series of control signals may be applied via a control bus 155 to bias each PIN diode. With the PIN diode forward biased and conducting a DC current, the PIN diode switch is on, and the corresponding antenna element is selected. With the diode reverse biased, the PIN diode switch is off. In some embodiments, one or more light emitting diodes (LEDs) may be included in the coupling network as a visual indicator of which of the antenna elements is on or off. An LED may be placed in circuit with the PIN diode so that the LED is lit when the corresponding antenna element is selected.

Further, the antenna apparatus may include switching at RF as opposed to switching at baseband. Switching at RF means that the communication device requires only one RF up/downconverter. Switching at RF also requires a significantly simplified interface between the communication device and the antenna apparatus. For example, the antenna apparatus provides an impedance match under all configurations of selected antenna elements, regardless of which antenna elements are selected.

Wireless MIMO antenna system 100 includes pattern shaping elements 160. Pattern shaping elements 160 in FIG. 1 extend from a printed circuit board. The pattern shaping elements may include directors and reflectors selectively connected to ground using, for example, a PIN diode. Directors may include passive elements that constrain the directional radiation pattern , for example to increase the gain . Pattern shaping elements such as directors and reflectors are generally known in the art. The reflectors and directors may be metal objects having any shape and placed near an antenna array such as an antenna antenna member pair mounted on a printed circuit board. An exemplary configuration of pattern shaping elements is discussed below with respect to FIG. 5.

Wireless MIMO antenna system 100 may also include a controller 150 coupled to the data encoder 101, the radios 120 and 121, the circuit 130, and pattern shaping elements 160 via a control bus 155. The controller 150 may include hardware (e.g., a microprocessor and logic) and/or software elements to control the operation of the wireless MIMO antenna system 100.

The controller 150 may select a particular configuration of antenna elements 140A-H that minimizes interference over the wireless link to the remote receiving device. If the wireless link experiences interference, for example due to other radio transmitting devices, or changes or disturbances in the wireless link between the wireless MIMO antenna system 100 and the remote receiving device, the controller 150 may select a different configuration of selected antenna elements 140A-H via the circuit 130 to change the resulting radiation pattern and minimize the interference. Controller 150 may also select one or more pattern shaping elements 160. For example, the controller 150 may select a configuration of selected antenna elements 140A-H and pattern shaping elements 160 corresponding to a maximum gain between the wireless system 100 and the remote receiving device. Alternatively, the controller 150 may select a configuration of selected antenna elements 140A-H and pattern shaping elements 160 corresponding to less than maximal gain, but corresponding to reduced interference in the wireless link.

Controller 150 may also transmit a data packet using a first subgroup of antenna elements 140A-H coupled to the radio 120 and simultaneously send the data packet using a second group of antenna elements 140A-H coupled to the radio 121. Controller 150 may change the substrate of antenna elements 140A-H coupled to the radios 120 and 121 on a packet-by-packet basis. Methods performed by the controller 150 with respect to a single radio having access to multiple antenna elements are further described in, for example, U.S. patent publication number US 2006-0040707 A1. These methods are also applicable to the controller 150 having control over multiple antenna elements and multiple radios.

Figure 2:
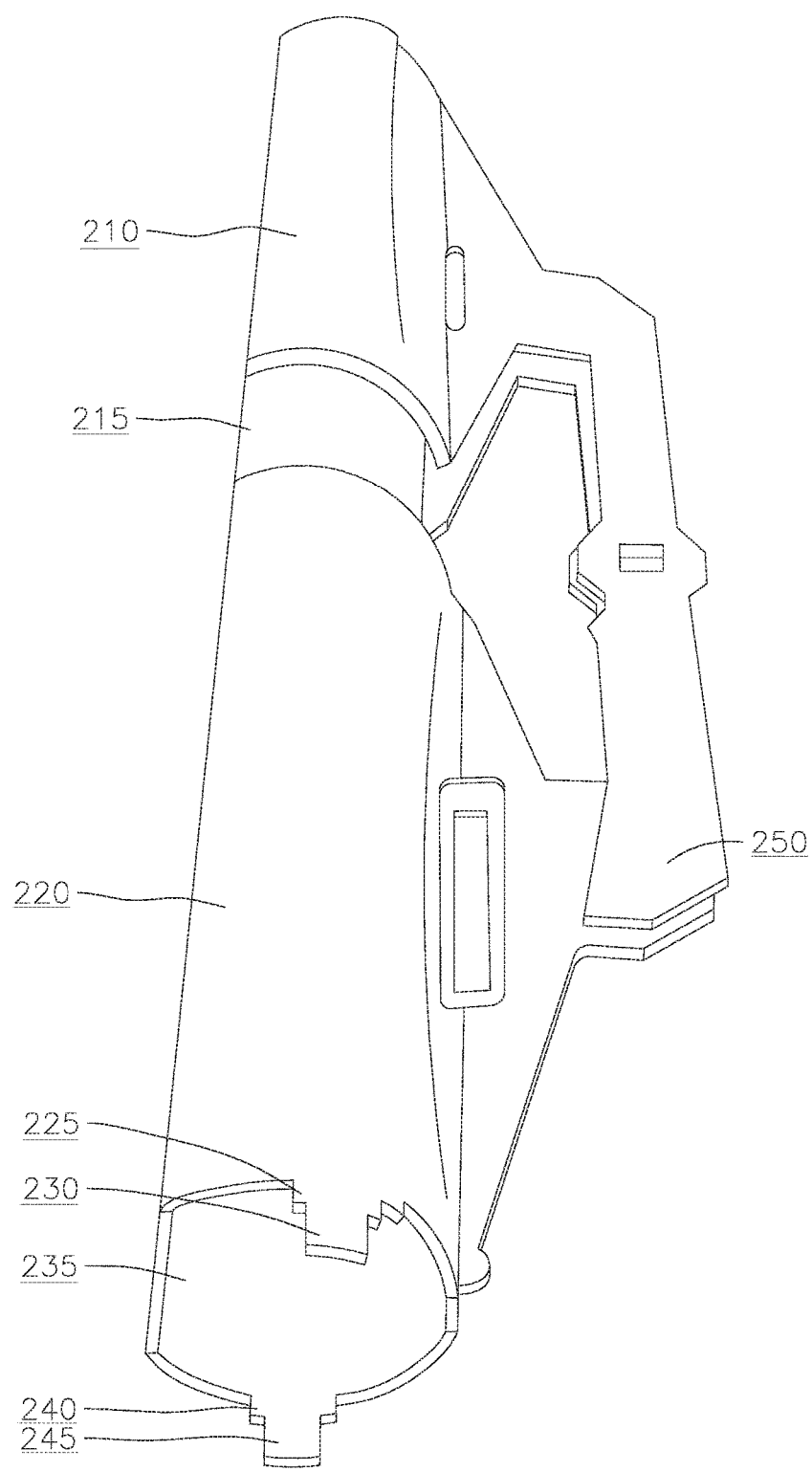
FIG. 2 illustrates a horizontally polarized antenna member pair for mounting on a printed circuit board.

FIG. 2 illustrates an antenna element for emitting a horizontally polarized radiation pattern for mounting on a printed circuit board. The antenna element illustrated in FIG. 2 includes a first antenna member and a second antenna member. The first antenna element includes an upper portion 210 and a lower portion 220. The second antenna element also includes an upper portion 215 and a lower portion 235. The antenna elements are connected at an RF feed point 250. When connected together, the first antenna member and second antenna member form a barrel-type shape having a slit near the middle of the structure. The antenna member pair FIG. 2 may transmit a radiation pattern having a frequency of about 5.0 GHZ in compliance with IEEE 802.11n.

The horizontally polarized antenna member pair of FIG. 2 may be mounted to the surface of a PCB. Antenna element lower portions 220 and 235 include tabs 230 and 245, respectively. The tabs are constructed to fit into a printed circuit board and may be secured via solder. Above each tab on lower portions 220 and 235 are shoulders 225 and 240, respectively. The shoulder is designed to maintain a spacing of each antenna lower portion above the printed circuit board.

An RF signal may be fed to the horizontally polarized antenna member pair of FIG. 2 via connector 250. Connector 250 is formed by bending a tab from antenna element 210 into an aperture of antenna element 215, and soldering the connection between the elements to form an antenna member pair.

Figure 3:
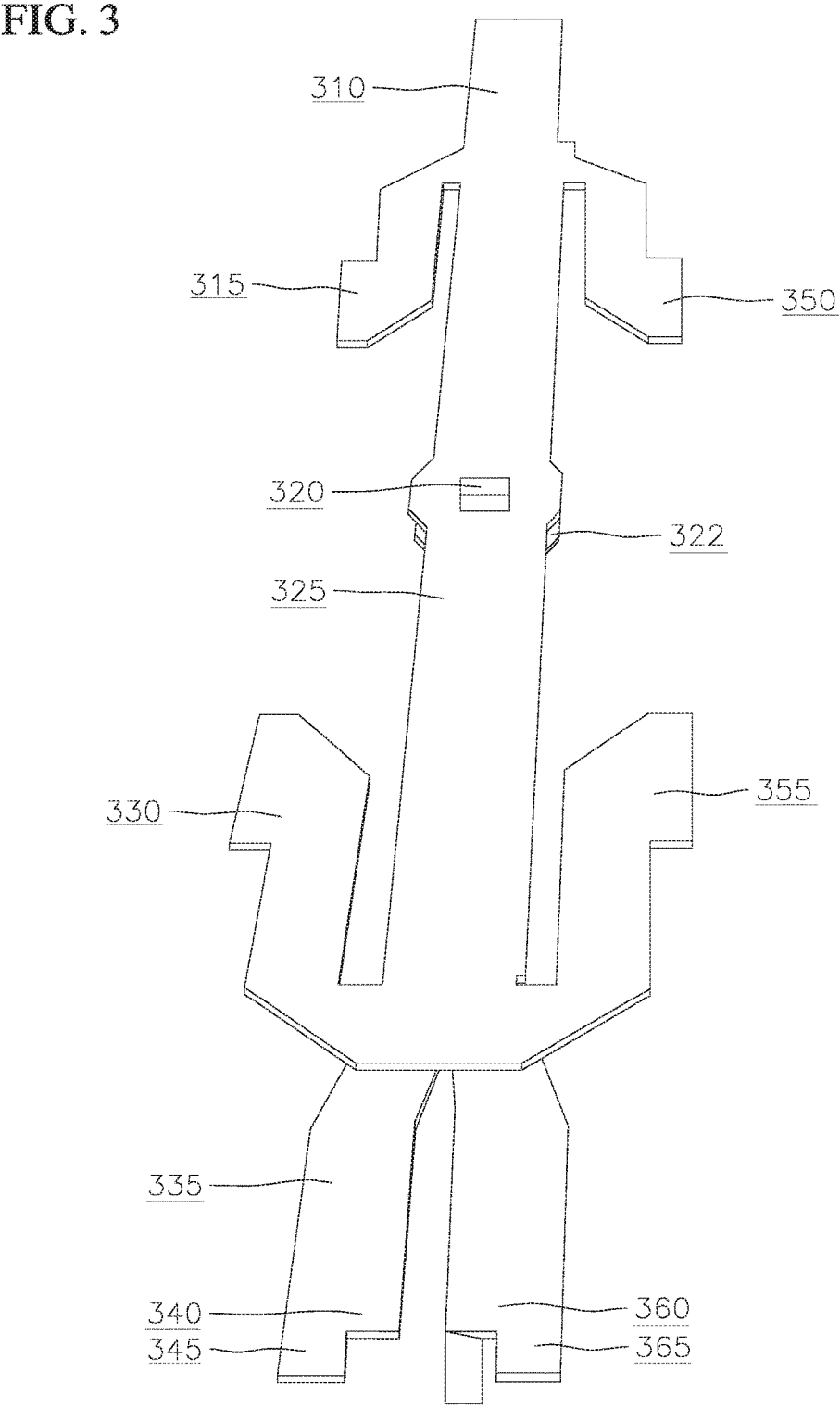
FIG. 3 illustrates a vertically polarized antenna member pair for mounting on a printed circuit board.

FIG. 3 illustrates a vertically polarized antenna member pair for mounting on a printed circuit board. The antenna member pair of FIG. 3 includes a first antenna member 325 and a second antenna member 322. The first antenna member includes a first end 310 and a second end having two finger elements 330 and 355. The second antenna member has finger elements which are about the same as the first antenna member. The antenna members are connected together to align along their central axis with the second antenna member being upside down with respect to the first antenna member. Hence, the fingers of the second antenna element are near the first end of the first antenna member, which is the opposite end of the fingers on the first antenna member. The antenna elements are connected at an RF feed point 320. When connected together, the first antenna element and second antenna element form a antenna member pair which provides a horizontally polarized radiation pattern. The antenna member pair of FIG. 3 may transmit a radiation pattern having a frequency of about 5.0 GHZ in compliance with IEEE 802.11n.

Second antenna element member 322 includes finger elements 315 and 350. Finger elements 315 and 350 are opposite to and form a magnetic pair with finger elements 330 and 355 of first antenna element 325.

The horizontally polarized antenna member pair of FIG. 3 may be mounted to the surface of a PCB using tabs and shoulders. Antenna element 322 includes tabs 345 and 365 which may be received and soldered to a PCB. Above tabs 345 and 355 are shoulders 340 and 360, respectively. The shoulder is designed engage the surface of the PCB.

An RF signal may be fed to the vertically polarized antenna member pair of FIG. 3 via connector 320. Connector 320 is formed by bending a tab from antenna element 325 into an aperture of antenna element 322 and soldering the antenna member pair elements.

Figure 4:
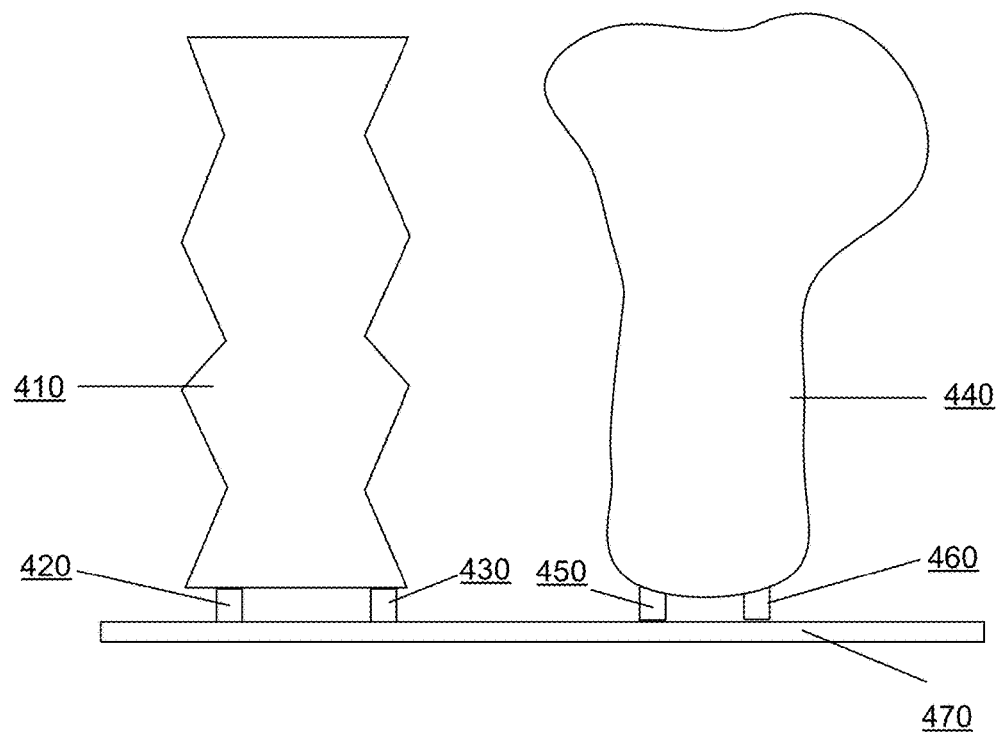
FIG. 4 illustrates a configuration of pattern shaping elements.

FIG. 4 illustrates a configuration of pattern shaping elements. Pattern shaping elements 410 and 440 may be mounted on a PCB 470. The printed circuit board may be manufactured from common planar substrates such as an FR4 printed circuit board (PCB).

The pattern shaping elements of the presently disclosed invention may have a variety of shapes and forms. Pattern shaping element 410 as illustrated in FIG. 4 has a symmetric shape with jagged edges on two opposing sides. Pattern shaping element 440 has a non-symmetrical shape, with one side having a more pronounced curve than the opposite side. Pattern shaping element 410 has a uniform height while pattern shaping element 440 has a non-uniform height. Pattern shaping element 410 has mounting tabs 420 and 430 and pattern shaping element 440 has mounting tabs 450 and 460 for mounting the pattern shaping element within a PCB 470.

Each of the pattern shaping elements may be selectively coupled to a ground portion of an antenna system, such as for example a ground plane in a PCB. By selecting different combinations of pattern shaping elements having different shapes and designs to use as a reflector or director, the radiation pattern emitted from one or more RF antenna elements, antenna member pairs, or a combination of elements and antenna member pairs can be shaped in many ways.

Figure 5:
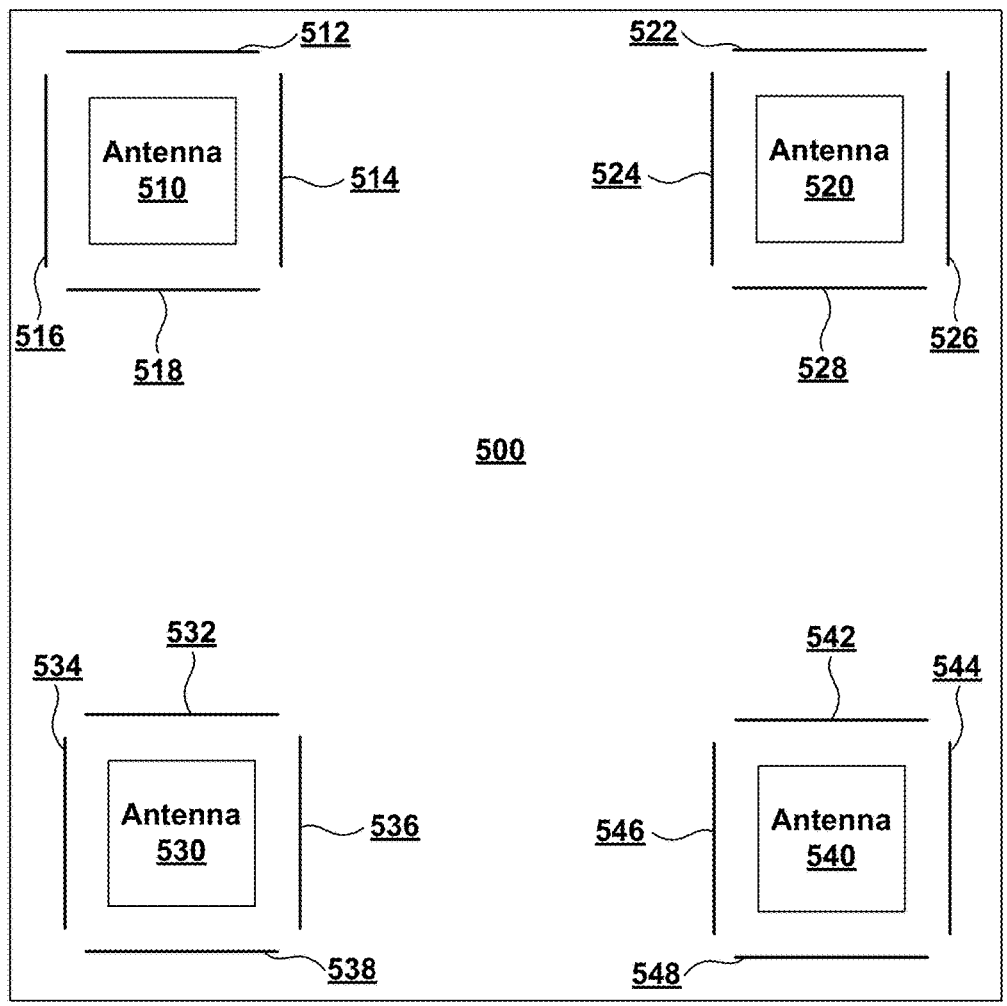
FIG. 5 illustrates a top view of a printed circuit board with an arrangement of antennas and pattern shaping elements.

FIG. 5 illustrates a top view of a PCB having antennas and pattern shaping elements mounted to the tap of the PCB. Mounted to PCB 500 are antennas 510, 520, 530 and 540. The antennas may form antenna member pairs which operate at a radio frequency of about 5.0 GHz. The antennas may be the same type of polarization or different polarizations. For example, antennas 510 and 540 may each be implemented as a horizontally polarized antenna member pair as discussed with reference to FIG. 2 and antennas 520 and 530 may each be implemented as a vertically polarized antenna member pair as discussed with reference to FIG. 3. When configured in this manner, the arrangement of antennas provides an omnidirectional dual polarization radiation pattern at 5.0 GHz.

Each of antennas 510, 520, 530 and 540 of FIG. 5 may be associated with one or more pattern shaping elements. Antenna 510 is associated with pattern shaping elements 512, 514, 516 and 518. Each of elements 512-518 may have any shape, whether symmetrical, non-symmetrical, uniform height or non-uniform height. By selectively grounding one or more pattern shaping elements associated with a particular antenna, the radiation pattern emitted from the antenna may be changed. Pattern shaping elements 522, 524, 526, and 528 are associated with antenna 520, pattern shaping elements 532, 534, 536, and 538 are associated with antenna 530, and pattern shaping elements 542, 544, 546, and 548 are associated with antenna 540. Each of the pattern shaping elements associated with antennas 520-540 may also be any shape and form and may be selectively coupled to ground to shape a radiation pattern for an antenna.

Though the pattern shaping elements are illustrated as being associated with a particular antenna, other configurations of pattern shaping elements are possible. For example, pattern shaping elements may be positioned in the middle of the PCB 500, along a portion of or entire perimeter of PCB 500, or arranged in some other manner irrespective of antennas on the PCB.

The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A wireless device, comprising:
two or more radios operating in parallel, wherein the two or more radios generate RF signals having a same center frequency and bandwidth;
a switching network that selectively couples the generated RF signals from the two or more radios to an antenna array;
an antenna array that generates a substantially omnidirectional radiation pattern, wherein the antenna array includes a plurality of selectable horizontally polarized antenna elements and a plurality of selectable vertically polarized antenna elements, the plurality of selectable antenna elements each having a corresponding radiation pattern;
a first plurality of connecting elements, each of the first plurality of connecting elements selecting one or more of the plurality of antenna elements by coupling one or more of the plurality of antenna elements to one or more of said radios;
a plurality of pattern shaping elements, wherein each of the plurality of a pattern shaping elements have a different shape;
a second plurality of connecting elements, each of the second plurality of connecting elements coupling one or more of the plurality of pattern shaping elements to ground; and
a controller that switches one or more of the second plurality of connecting elements to utilize a pattern shaping element with a particular shape and switches one or more of the first plurality of connecting elements, wherein utilization of the pattern shaping element with the particular shape and selection of one or more of the plurality of antenna elements by respective one of the first plurality of connecting elements change the substantially omnidirectional radiation pattern generated by the antenna array and wherein one or more of the selectable horizontally polarized antenna elements have a barrel-type shape with a slit.

2. The wireless device of claim 1, wherein the plurality of a pattern shaping elements includes a director.

3. The wireless device of claim 1, wherein the plurality of a pattern shaping elements includes a reflector.

4. The wireless device of claim 1, wherein one or more of the plurality of connecting elements are mounted on an outer surface of a printed circuit board.

5. The wireless device of claim 1, wherein each of the plurality of connecting elements includes a tab, the tab extending into a printed circuit board.

6. The wireless device of claim 1, wherein the antenna array comprises a horizontal antenna array, and wherein the substantially omnidirectional radiation pattern is substantially in a plane of the horizontal antenna array.

7. The wireless device of claim 1, wherein two or more of the plurality of antenna elements are selectively coupled to a radio frequency feed port to generate a substantially omnidirectional radiation pattern.

8. The wireless device of claim 1, wherein the controller selects a configuration of one or more of the plurality of antenna elements to generate a substantially omnidirectional radiation pattern, wherein the substantially omnidirectional radiation pattern changes based on the selected configuration.

9. The wireless device of claim 1, wherein one or more pattern shaping elements of the plurality of a pattern shaping elements differ in height and width from other pattern shaping elements of the plurality of pattern shaping elements.

10. The wireless device of claim 1, wherein the plurality of pattern shaping elements includes one or more pattern shaping elements that have symmetrical shapes and one or more pattern shaping elements that have asymmetrical shapes.

11. The wireless device of claim 1, wherein each of the plurality of pattern shaping elements has a non-symmetrical shape with respect to a vertical axis through a center of the respective pattern shaping element.

12. The wireless device of claim 1, wherein at least one of the selectable horizontally polarized antenna elements comprises:
a first antenna member and a second antenna member connected at an RF feed point,
tabs associated with a lower portion of each of the first and second antenna members, and
shoulders associated with the lower portion of each of the first and second antenna members, the shoulders maintaining a spacing for each of the lower portion of the first and second antenna members above a printed circuit board to which the horizontally polarized antenna element is mounted to.

13. The wireless device of claim 1, wherein at least one of the selectable the vertically polarized antenna elements comprises:
a first antenna member and a second antenna member connected at an RF feed point,
finger elements at each of the ends of the antenna members, the finger elements of the second antenna member forming a magnetic pair with the finger elements of the first antenna member,
tabs, and
shoulders, wherein the tabs and the shoulders mount the vertically polarized antenna element on the printed circuit board.

* * * * *